Nov. 6, 1956     E. H. SCHANE     2,769,478
MACHINE FOR FORMING WIRE INTO A HELIX
Original Filed Nov. 29, 1945     6 Sheets-Sheet 1
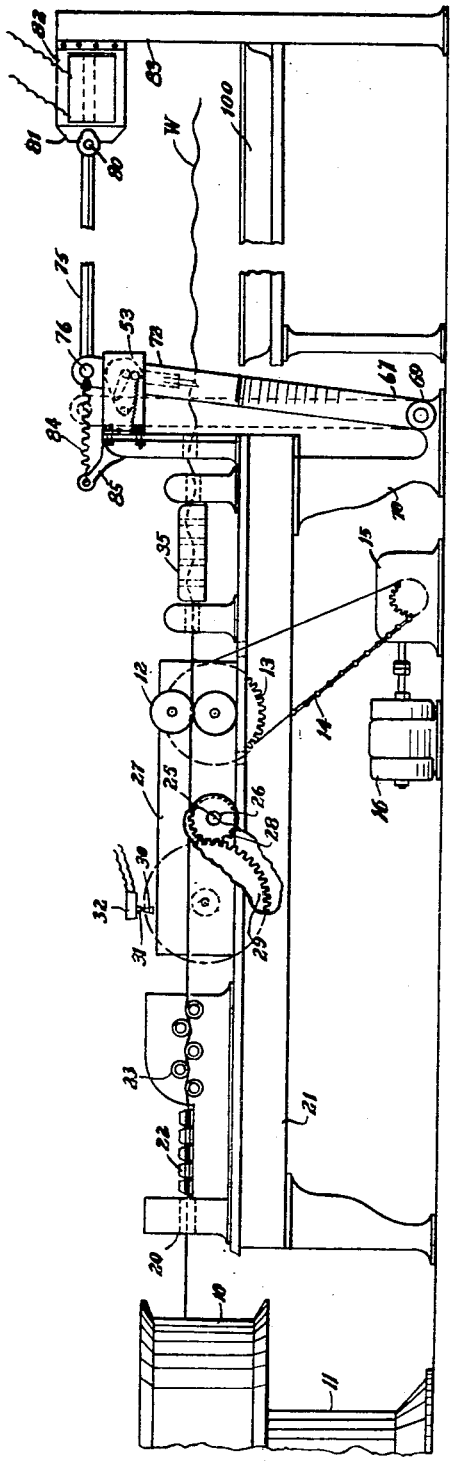
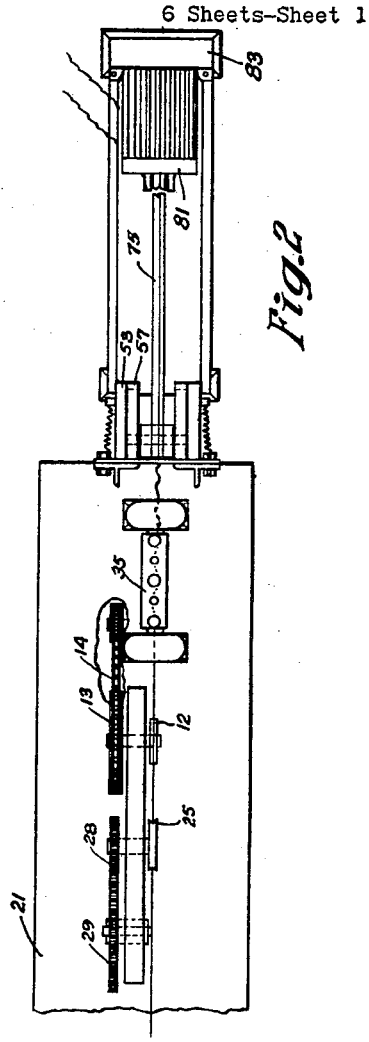
INVENTOR.
EDWARD H. SCHANE
BY
J. V. Douglas
ATTORNEY Nov. 6, 1956   E. H. SCHANE   2,769,478
MACHINE FOR FORMING WIRE INTO A HELIX
Original Filed Nov. 29, 1945   6 Sheets-Sheet 2
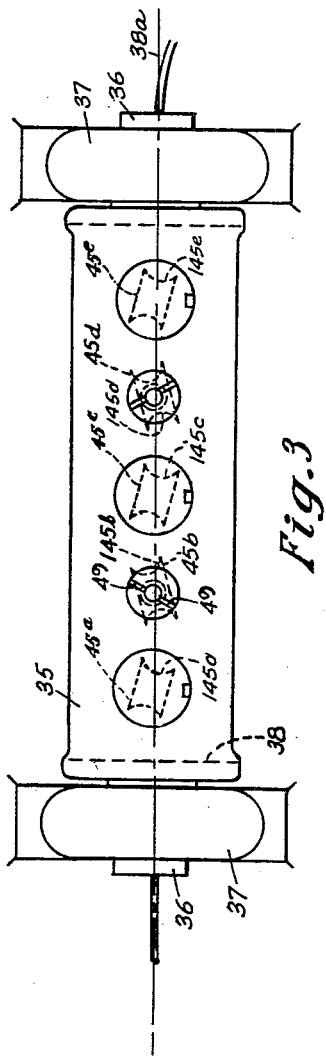
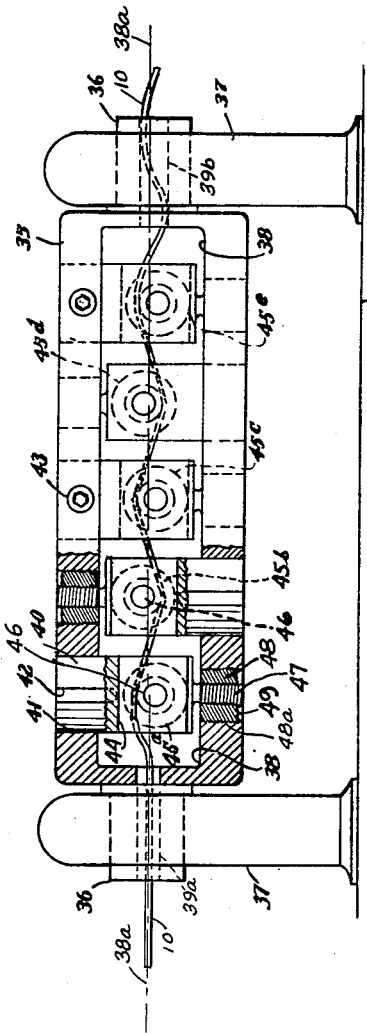
INVENTOR.
EDWARD H. SCHANE
BY
J. S. Douglas
ATTORNEY

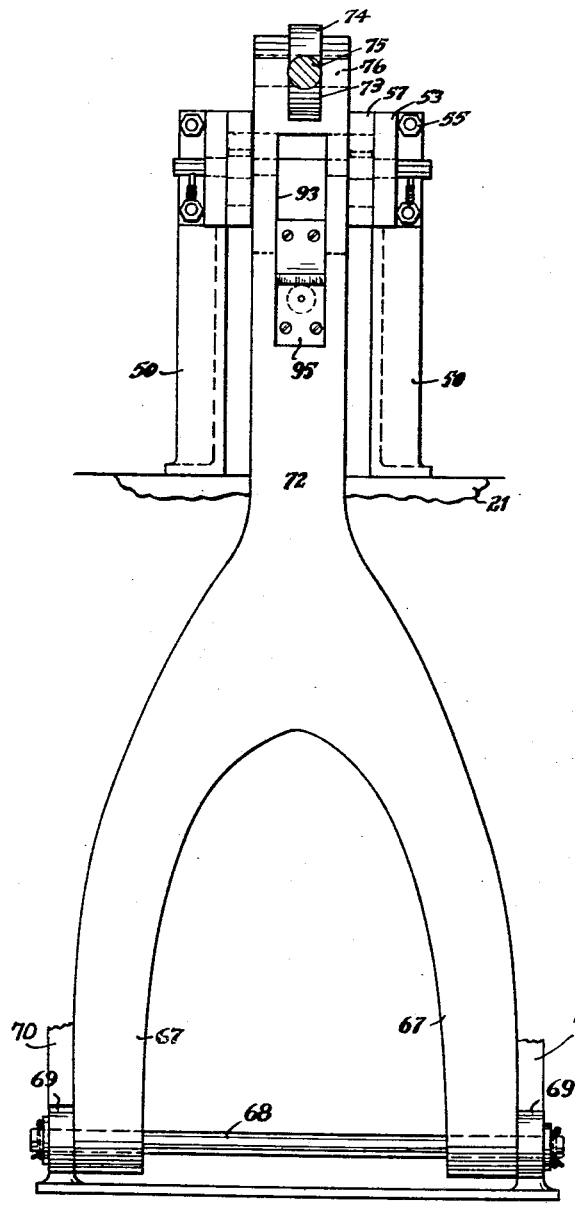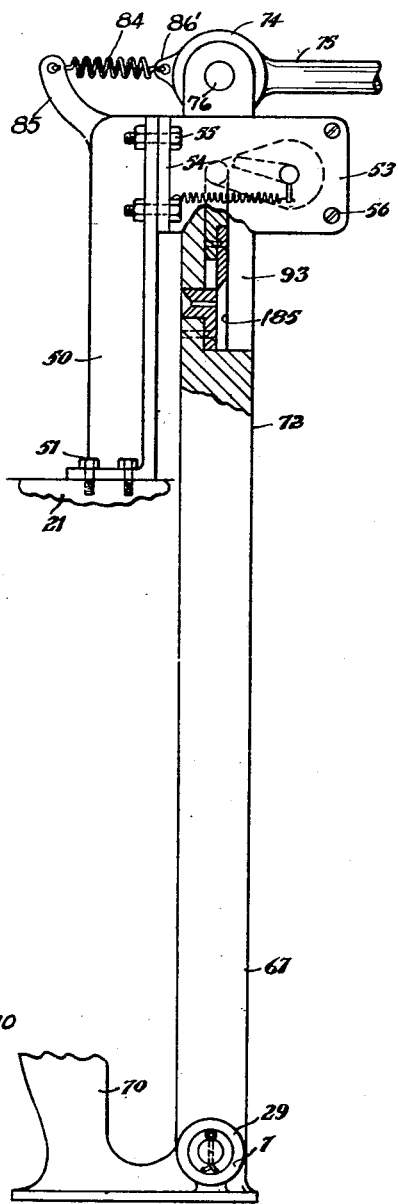
Fig. 5
Fig. 6

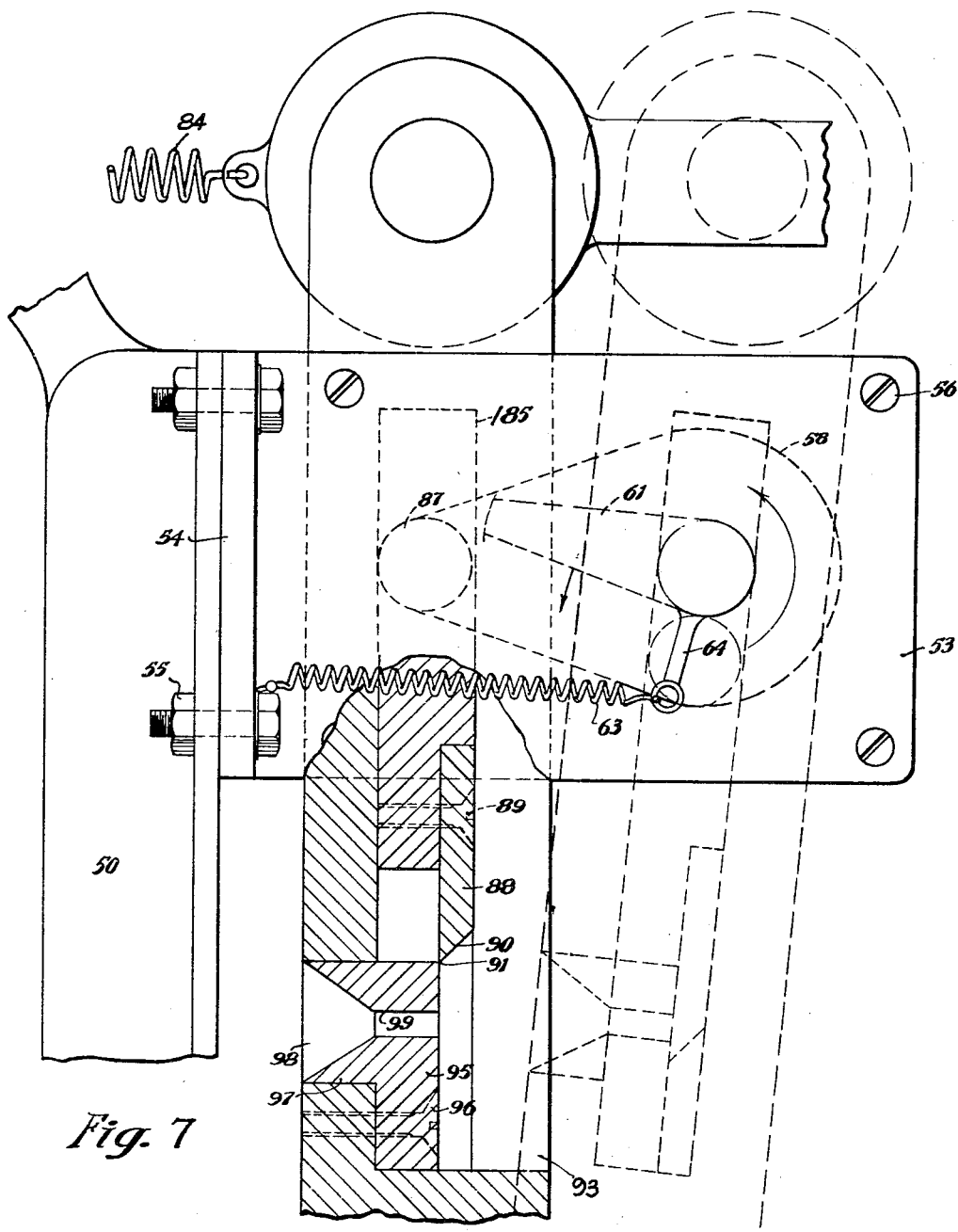

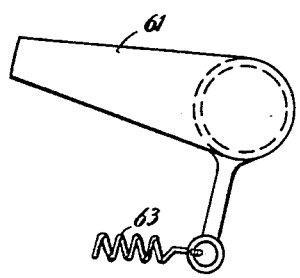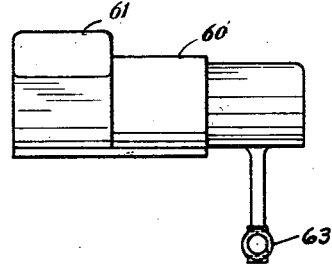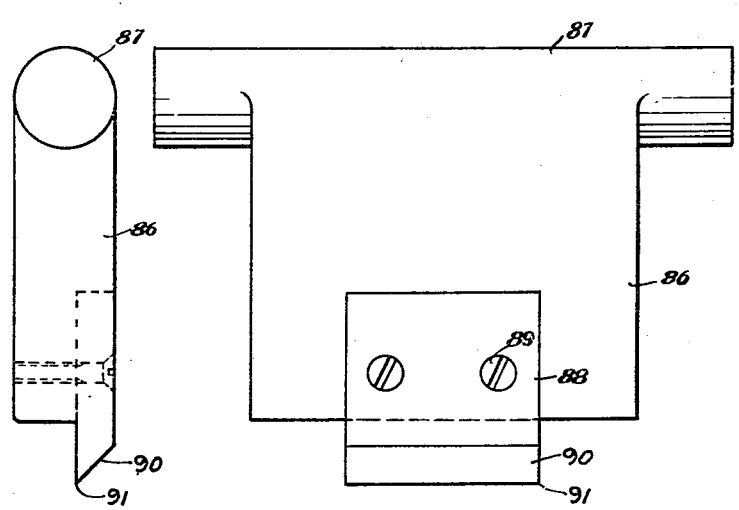

Nov. 6, 1956 E. H. SCHANE 2,769,478
MACHINE FOR FORMING WIRE INTO A HELIX
Original Filed Nov. 29, 1945 6 Sheets-Sheet 6
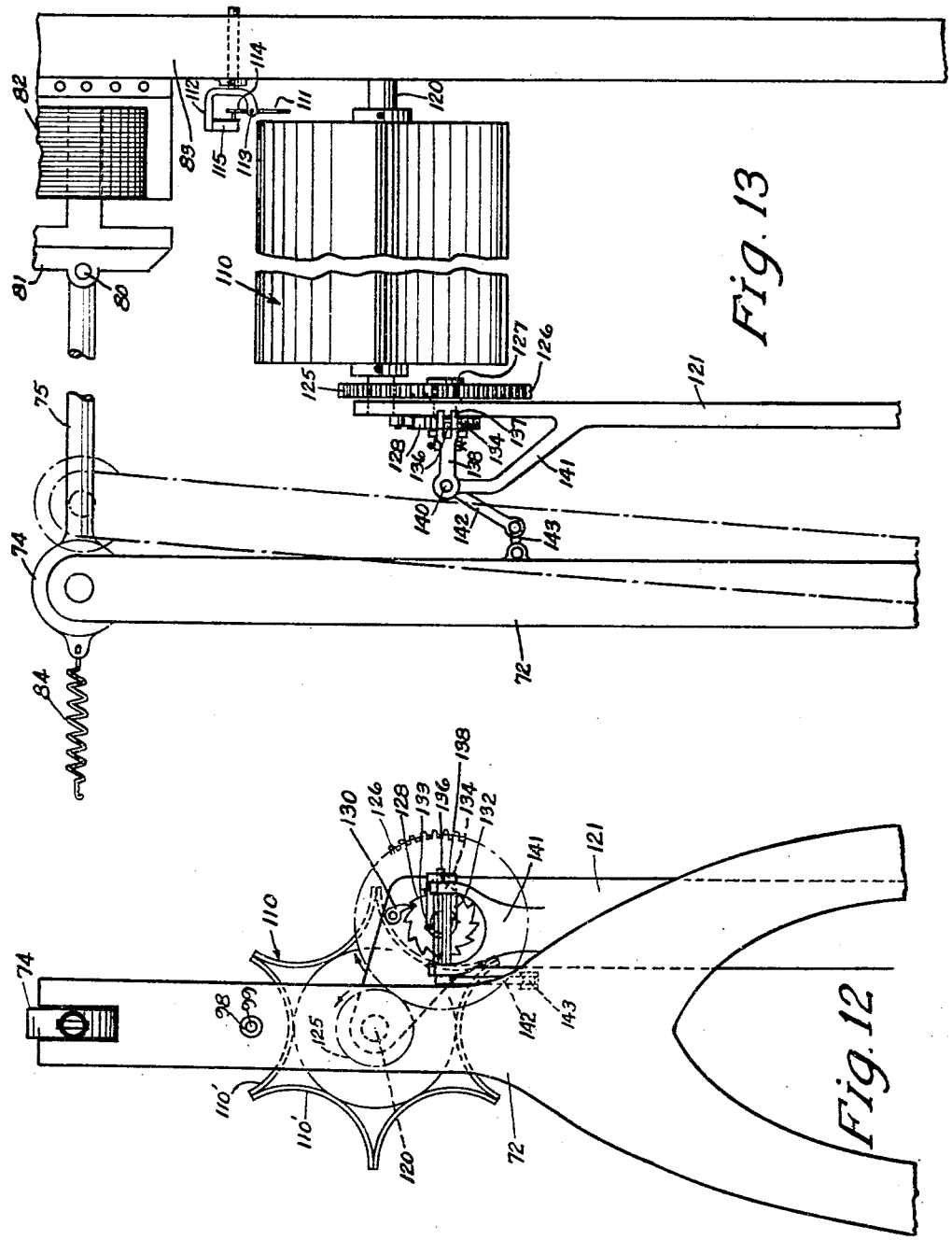
INVENTOR.
EDWARD H. SCHANE
BY
J. N. Douglas
ATTORNEY

United States Patent Office 2,769,478
Patented Nov. 6, 1956

2,769,478

MACHINE FOR FORMING WIRE INTO A HELIX

Edward H. Schane, Lakewood, Ohio, assignor to Fanner Manufacturing Company, Cleveland, Ohio, a corporation of Ohio Original application November 29, 1945, Serial No. 631,605, now Patent No. 2,588,663, dated March 11, 1952. Divided and this application August 10, 1951, Serial No. 241,298

1 Claim. (Cl. 153—66)

This invention relates to apparatus for the shaping of wire into predetermined formation, and more particularly to machines for forming a wire into short lengths having a helical form with a relatively large pitch and small diameter. This is a division of my co-pending application, Ser. No. 631,605 filed November 29, 1945, now Patent No. 2,588,663 issued March 11, 1952.

Although the invention about to be described will be described in conjunction with its use for forming so-called wire splints, it will be apparent that it may be useful for other purposes, and it is not my intention to limit the invention to the specific use described.

Heretofore it has been proposed to provide splints for reinforcing wires which are used as power transmission lines or the like. These usually comprise a plurality of wires shaped in helical form, the inside diameter of which is the same as the diameter of the wire to be reinforced and the pitch of which is determined by the number of wires which are to be combined to make up the splint. These wires are wrapped around the transmission line at the points at which it is supported from the poles or towers. Such a splint is shown in the Peterson Patent No. 2,275,019.

There have been several different means suggested for forming the wires of these splints but nearly all have been subject to certain disadvantages which it is the purpose of the present invention to overcome.

Among the disadvantages of the prior art devices for forming splints was the lack of uniformity of product; the high cost of manufacture; and the extreme slowness of production. Furthermore, it was difficult to change machines for making wire of one pitch and diameter to that of another pitch and diameter.

By my present invention, I have made a machine which can turn out a uniform product at a high speed and which can quickly and easily be changed to provide the desired pitch and diameter.

Still other advantages of the invention, and the invention itself, will become more apparent from the following description of an embodiment thereof, which description is illustrated by the accompanying drawings and form a part of the specification.

In the drawings:

Fig. 1 is a side elevational view of a machine embodying my invention; with an alternative position of the cutoff mechanism shown in dashed lines;

Fig. 2 is a fragmentary plan view thereof;

Fig. 3 is an enlarged top plan view of the wire forming portion of my machine;

Fig. 4 is an elevational view thereof with a portion broken away and shown in section;

Fig. 5 is a front elevational view of the cutoff mechanism on an enlarged scale;

Fig. 6 is a side elevational view thereof, with certain parts broken away and shown in section;

Fig. 7 is a still further enlarged view of the cutoff head, certain parts being broken away and shown in section, and other parts shown by broken lines, and illustrating in dashed lines an alternative position which may be taken by the cutoff head;

Fig. 8 is a side elevational view of a cam track switch removed from the head;

Fig. 9 is a front elevational view thereof;

Fig. 10 is a side elevational view of a cutoff member removed from the head;

Fig. 11 is a front elevational view thereof;

Fig. 12 is an elevational view, similar to Fig. 5 of a modified form of the invention; and Fig. 13 is a side elevational view thereof.

Generally, the machine of my invention includes a support for supporting a reel of wire which is to be made into sprints, the wire is first passed through a straightener, it then operates by its travel, a measuring device, after which it is passed through a forming head where it is formed to the desired shape and, subsequently, is cut off in the desired lengths by a cutoff mechanism under control of the measuring device.

More specifically, the reel of wire 10 is shown as being revolvably supported on a pedestal 11 opposite the entering end of the machine.

The wire is pulled through the machine by feed rollers 12 driven by a sprocket 13 which is connected by a chain 14 through a transmission 15 to a motor 16. Although only one set of feed rollers are shown, it will be obvious that more than one set can be used if desirable.

The wire first passes through a guide 20 supported on the end of a bed 21 and then between the rollers 22 and 23 of a straightener. The straightener may be of any conventional form, that shown comprising a first set of staggered rollers 22 disposed with their axes on a vertical plane and the second set disposed with their axes on a horizontal plane.

The wire then passes around, being wrapped for one convolution, a roller 25 which is supported on a shaft 26 journalled in a vertically extending plate 27. The shaft 26 on the other side of the plate, as illustrated in the part broken away, is provided with a spur gear 28 that meshes with another gear 29, also rotatably journalled on said plate. The gear 29 carries a cam 30 which is adapted to contact once each revolution with the operating pin 31 of a switch 32.

Therefore, it will be seen that the switch is operated each time a certain amount of wire is drawn over the roller 25.

The gears 28 and 29 are readily removable and may be replaced by gears of different ratio to cause the switch to be operated according to desired lengths into which the wire is to be severed. The switch 32 is carried by an adjustable bracket not shown so that it may be moved to the proper position of contact for the cam 30 regardless of the size of the gear 29.

I also contemplate a roller such as 25 which may have a circumference equal to the length into which the wire is to be severed. In this case there would be no necessity for the gearing mentioned, and the cam could be carried directly by the roller or on the shaft which carries the roller.

The wire is, as previously stated, drawn through the straightening rolls and over the measuring rolls by the feed rolls 12 which are held in engagement with the wire on opposite sides.

It will be noted that since considerable force is required to pull the wire through the straightener, the wire intermediate the straightener and the feed roll is relatively taut, which thus assures that the measuring device will be held in close contact therewith and without slippage, which provides accurate measurement of the wire.

The feed rolls 12 may, if desired, be held in spring pressed engagement with the wire. In either event, the feed rolls pull the wire through the straightener and push it through the forming machine.

The forming head, as best shown in Figs. 3 and 4, comprises a housing 35, which may be of cylindrical form, having a pair of reduced end portions or trunnions 36. These end portions are rotatably journalled in suitable bearings in supports 37 which supports rise in longitudinally spaced relation to each other from the bed 21. The housing is provided with a lengthwise passage 38 which is open at opposite sides of housing 35. A restricted inlet opening 39a extends through the end trunnion 36 into the lengthwise passage 38 at the wire inlet end of housing 35 and an outlet opening 39b extends from the lengthwise passage 38 at the opposite end of the housing through the end trunnion 36 thereat. As seen in Figs. 3 and 4, the lengthwise housing passage 38 throughout its entire length is substantially larger in cross-section in all directions than the inlet opening 39a. The end trunnions 36 and the supports 37 support the housing 35 for free rotation about axis 38a, which is the conjoint axis of the lengthwise passage 38 and the inlet opening 39a. In the illustrated embodiment it is also the axis of the outlet opening 39b.

The housing 35 is formed with a plurality of transverse passages 41 which intersect the lengthwise passage 38 at axially spaced locations along the lengthwise passage. In the illustrated embodiment five such transverse passages are shown although any suitable number may be provided, as desired. Each of these transverse passages 41 receives a cylindrical roller-supporting body 40 having a snug fit in that passage. Each of the bodies 40 is bifurcated to provide a slot 44 at which is located a roller 45a, 45b, 45c, 45d, 45e respectively. Each of these rollers is journalled in the corresponding slot on a pin 46 for rotation with respect to its supporting body 40, the pin being supported by the opposite sides of body 40. Each of the rollers is positioned in the lengthwise housing passage 38 and each has a peripheral groove 145a, 145b, etc. which encircles the axis of rotation of that roller. The width of each roller groove is substantially less than the width of the lengthwise housing passage 38 as best seen in Fig. 3.

Each of the roller-supporting bodies 40 is formed with a threaded stem 47 received in an internally and externally threaded bushing 48, which is threadedly received in an opening 48a in a wall of housing 35. Preferably the external threads on stem 47 and bushing 46 are left and right hand threads, respectively, or vice versa. Bushing 48 is provided with diametrically opposed slots 49 (Fig. 3) on its outer end adapted for engagement by a spanner wrench for adjustment of the same. In the illustrated embodiment, the stem-receiving bushings 48 for successive roller-supporting bodies 40 are disposed on opposite sides of the housing 35, above and below the conjoint axis 38a in Fig. 4. Each roller-supporting body 40 has a keyway 42 into which a set screw 43 may be inserted to hold the body against turning in passage 41, when desired.

As best seen in Fig. 4, each of the roller grooves 145a, 145b, 145c, 145d and 145e presents a wire-receiving peripheral portion which is offset transversely from the conjoint axis 38a. Successive rollers 45a, 45b, 45c, 45d, and 45e along the lengthwise passage 38 present these wire-receiving, transversely offset peripheral portions located respectively on opposite sides of axis 38a (above and below this axis in Fig. 4). Also, the successive rollers have their respective axes of rotation extending at opposite oblique angles to the conjoint axis 38a, as best seen in Fig. 3. With this arrangement, a helical twist is imparted to the wire 10 as it engages the wire-receiving offset peripheral portions of the successive rollers 45a, 45b, 45c, 45d and 45e in its travel from the inlet end of passage 38 to the outlet end.

By virtue of the above described mounting of each roller-supporting body 40 on housing 35, each of these bodies can be adjusted toward or away from the conjoint axis 38a to position its roller at the desired location transversely with respect to this axis. Also, each of the roller-supporting bodies 40 may be turned within the respective transverse passage 41 to any desired angular position so as to correspondingly adjust the oblique angle of the rotational axis of its roller with respect to the conjoint axis 38a. By such adjustments the forming head can be adjusted to produce wire helices having wide range variations in diameter and pitch.

Preferably, I have found an angle of inclination of the roller of approximately 13 degrees will provide a satisfactory operation. This angle may, however, be varied to provide the desired performance.

The wire is threaded through the forming head as best shown in Fig. 4, being pushed through the head by the feed rolls 12. The passage of the wire through the head causes it to rotate freely about its axis and the direction of revolution mainly determines whether the wire will be a left or right hand helix. In this respect, this is initially determined by rotating the head manually during the wire threading operation, in the proper direction to provide either a right or left hand lead to the helix. After the wire is once threaded through the head and during the passage of the wire through the head, the head will automatically revolve in the correct direction to provide the desired lead.

The wire, after being formed, passes through a cutoff mechanism where it is severed into the desired lengths. The cutoff mechanism is controlled by the operation of the switch 32 which in turn is operated by the measuring mechanism.

The cutoff mechanism includes a cutter which is arranged to travel for a short distance with the wire and to quickly sever the wire while the wire is moving.

The end of the bed 21 supports in spaced parallel relation a pair of upright members 50 of angular cross section that may be secured to the bed in any desired manner as by bolts 51. The upper ends of the members have secured thereto a pair of cam supporting plates 53 which extend from the uprights 50 in spaced parallel relation to each other. The plates are provided with base flanges 54, and are secured to the uprights by bolts 55. These plates have secured on their opposing inner faces, by screws 56, cam plates 57, each of which is formed with a pear shaped recess 58, the wall of which constitutes a cam surface, and the purpose of which is to guide and operate a cutter blade, later described.

The plates 53 and 57 are formed with aligned apertures in which is journalled a cam switch member, best shown in Figs. 8 and 9. The cam member includes a cylindrical body portion 60 which is journalled in the apertures and has a cam track switch 61 which is disposed in the recess 58 and is held against the top wall or cam surface by a spring 63 that has one end secured to a lever 64 on the other end of the cam member and the other end fastened to the base 54. It will be observed that the spring 63 normally holds the switch 61 against the top of the cam surface, but that the switch may be moved against the tension of the spring 63 downward in the recess, the body 60 being free to revolve in the apertures.

The actual cutoff mechanism includes a cooperating cutter blade and die which are both carried by a pivoted upright support. The blade is operated by the cam surface upon pivotal movement of the support. The support is best shown in Figs. 5 and 6 and is substantially an inverted Y form, being provided with spaced apart legs 67, the lower ends of which are pivotally journalled on a rod 68 carried in supports 69 that may be integral with the leg 70 supporting the bed 21. The legs 67 extend upward where they merge and form the upright portion 72 that extends upward between the plates 57, projecting beyond the upper end thereof. The upper extremity of the support is slotted at 73, and an eye 74 of an operating rod 75 is connected therein by a cross pin 76. The operating rod 75 is pivotally connected at 80 to the armature 81 of a solenoid magnet 82 which is carried on the upper end of an upright support 83 (Fig. 1).

The solenoid is adapted to be energized by a source of current, not shown, under control of the switch 32 to attract the armature into the solenoid and move the rod 75. Movement of the rod in the other direction is effected by a spring 84, one end of which is connected to an arm 85 extending from the bracket 50 and the other end of which is connected into a projection 86' on the eye 74.

The portion 72 of the cutter support is provided with a slot 185 extending through the sides of the support and in which is reciprocably journalled the cutter head. The cutter head includes a substantially rectangular body 86, that extends between the walls of the slots, and the upper end is provided with a cross pin 87, the ends of which extend beyond the slot into and are guided by the walls of the recesses 58. The edges of the body 86 extend flush with the sides of the member 72 and abutt the plate 57 which prevents lateral movement thereof. The cutter blade 88 is set into a rectangular recess in the body 86 being held therein by screws 89 which extend through the plate and are threaded into the body. The lower edge of the blade is beveled at 90 to provide a sharp cutting edge 91 at its lower extremity.

The front side of the member 72 is provided with a rectangular opening 93 which extends into the slot 185. At the lower end of this opening, there is provided a wire guide and a cutter block which comprises a rectangular body 95 secured in the bottom of the recess by screws 96 and which is provided with a rearwardly extending guide 97 disposed in an opening through the rear wall of the recess. The guide 97 is provided with a flared opening 98 which connects with a cylindrical channel 99 that opens through the front side of the block 95. The cutter blade 88 is adapted to slide over the front face of the block 95 and cut off the wire which extends through the channel 99.

The operation of the cutoff mechanism is as follows:

The wire, after being formed into the forming head, passes through the flared opening 98 and the channel 99 in the cutoff block 95. After a predetermined length of wire has passed through the block, the switch 32 is operated to cause the solenoid 82 to be energized which moves the upper end of the support 72 from the position shown in full lines in Fig. 7, toward the position shown in the dashed line. The ends of the cross pin 87 on the cutter engage with the bottom surface of the cam lever 61 which thus forces the pin 87 and the block 86 downward as shown. The blade passes over the channel 99 and severs the wire. Continued forward movement of the member 72 causes the cross pin ends 87 to enter into the upwardly curved portion of the cam which is defined by the wall 58 and the body of the lever 61, and by which the block 86 is moved upwards as indicated by the curved arrow in Fig. 7. The upward movement of the block 86 may be assisted by a suitable spring if desired, but I have found that the inertia, during operation of the apparatus, is sufficient to carry the cross pin in its desired path.

The energization of the solenoid is only momentary, the duration being only sufficient to afford a full stroke of the armature after which it is released and the spring 84 then pulls the support 72 backwards to its upright position. The cross pin after the downward stroke is quickly raised, withdrawing the cutter blade from in front of the channel 99 in the cutter block before the support starts on the backward travel. The cross pin 87 then travels backward in the recess 58 above the lever 61 which is pushed downward by the camming action of the pin 87 between the upper surface of the channel 58 and the top of the levers 61 causing the lever to move downward until such a time as the cross pin travels beyond the cam 61, after which the levers are snapped upward to the position shown in Fig. 7 by the spring 63. At this time the ends of the cross pin are in the apex of the cam recess 58 and held against upward or downward movement.

The pieces severed from the wire drop down and are collected in the pan 100.

It will thus be seen that wire is first drawn off of the reel, straightened in the straightener section by the section by the rollers 22—23, and measured by the roller 25, the pulling being effected by the rollers 12. It is then pushed through the forming head and through the cutoff mechanism. After a predetermined length of wire has passed through the forming head as measured by the measuring rolls and its accompanying mechanism, the cam 30 trips the switch 32 which causes the momentary energization of the solenoid to provide the cutoff action just described. The cutoff mechanism operates quickly, cutting the wire before it has a chance to buckle. The forward motion of the cutoff mechanism with the wire also helps to prevent buckling of the wire.

I have found that with the arrangement shown, I can provide substantially equal lengths of wires and hold these lengths within a very small tolerance. If desired, the speed of the cutoff mechanism can also be controlled so as to insure exact synchronism of travel of the mechanism with the wire by connecting a dash pot to the solenoid. I have found, however, that the mechanism will operate satisfactorily and sufficiently accurately to render this additional expedient unnecessary.

In the preceding description, I have shown how the length of the wire may be determined by the measuring rolls before formation into helical form. In Figs. 12 and 13, I have shown a mechanism wherein the length of the wire is determined after it has been formed into a helix. In this embodiment, the wire, after it passes through the forming head, travels beyond the cutoff mechanism until the end engages a target. The target is moved by the wire and actuates a switch which controls the operation of the solenoid and hence the cutoff mechanism. It will be seen that this provides a quicker and simpler means of adjustment for determining the lengths of the wires being cut off since it does not require changing gears or measuring rolls.

More particularly, the wire passes through the cutoff mechanism and into a trough shaped guide 110 which guides the wire therethrough into contact with a target 111. The target 111 is carried by a bracket 112 which is adjustably carried by the frame 83. The operation of the target is such that when the wire contacts it, it is caused to pivot at 113 and the end 114 actuates a switch 115. The actuation of this switch causes the solenoid to be energized, actuating the cutoff mechanism and cutting off the wire.

The guide member 110 may comprise a series of troughs 110' supported in a circle about a shaft 120 and each adapted to guide the wire. The shaft is rotatably journalled in the frame 83 and a sub frame 121. The guide assembly may be moved longitudinally on the shaft 120, the position thereof being determined by the lengths of the wires being severed. Preferably, it is positioned in close proximity to the target 111. The shape of the troughs may also vary. The shape shown being semi-cylindrical merely for simplicity of disclosure of the invention.

The trough guides the wire to the target and when the wire is cut off, it drops into the trough which is revolved counterclockwise to dump the wire into a receptacle not shown.

Preferably, there are a multiplicity of troughs. In the drawings, I have shown six. It will be appreciated that the number may be varied within the wide range. It is desirable to rotate the trough member a fraction of a revolution at each cutoff so as to provide an empty trough for each succeeding lengths of wire. This movement is also preferably effected on the backward stroke of the cutoff member 72.

In order to effect this rotation, I provide a spur gear 125 on the shaft 120 which meshes with a larger spur gear 126 carried on a short shaft 127 journalled in the frame 121. The ratio between the two gears may be 2 to 1. Also secured to the shaft 127 is a ratchet gear 128 which is disposed on the other end of the shaft 127 on the left side of the support 121.

A stationary pawl 130 engages with the ratchet to prevent it from turning in the wrong direction and a ratchet pawl is used, connected by a linkage to the frame 72 to cause the step-by-step movement of the gear 126.

Rotatably journalled on the shaft 127 is a lever 132 which is held on the shaft by a key 133. This bracket carries a pawl 134 disposed in engagement with the teeth of the ratchet. The end of the bracket 132 is provided with a pin 136, which is engaged in a fork 137 of a lever 138. The lever 138 is carried on the end of a rod 140, which rod is rotatably journalled in a bracket 141 on the frame 121. The other end of the rod carries a lever 142 which is connected by a link 143 to the frame member 72 of the cutoff mechanism.

In operation, when the member 72 is urged forward by the solenoid 82, the wire is cut off and drops into one of the troughs 110'. The forward movement of the member 72 rotates the lever 142 and shaft 140 counterclockwise, raising the forked end of the lever 138 and with it the pawl support and pawl. When the spring 84 pulls the member 72 back to its upright position, by a reversal of movement, the pawl 134 is moved downward to rotate the ratchet wheel one tooth. This movement is communicated to the gear 126 which rotates the gear 125 and hence the trough member is rotated, in this case; one sixth of a revolution each time a piece of wire is cut off. Eventually, the trough reaches a lower position where the wire is dumped out. In this manner, a clear trough is provided for each succeeding piece of wire.

It will be appreciated that with this apparatus, the length of the wire being cut can be quickly, easily and accurately determined by the position of the target 111. This makes it possible to cut the wire into any length desired merely by the positioning of the target. It will be appreciated that the end of the trough member should be close to the target and that the target should be large enough to be engaged by the end of the piece of wire. In this respect, narrowing the sides of the trough at the target end increases the accuracy of the measurement.

It will also be clear that many changes can be made in the exact mechanism other than that shown. For instance, ratchet and pawl mechanism for rotating the trough member is capable of assuming a great variety of forms, the form shown being for the purpose of explaining the invention.

Having thus described the wire helix forming machine of the present invention, together with apparatus for feeding, straightening, cutting off and measuring the wire which is suitable for use with this invention, I am aware that numerous and extensive departures may be made therefrom without departing from the spirit or scope of my invention which is defined in the appended claim.

I claim:

A forming machine for forming a wire into a helix of predetermined pitch and diameter comprising housing means having a lengthwise passage therethrough, means at the wire inlet end of the housing means defining a restricted inlet opening communicating with said lengthwise passage for the entry of the wire into said lengthwise passage, said lengthwise passage throughout its length being substantially larger in cross-section in all directions than said inlet opening, means defining an outlet opening at the opposite end of said housing means for passing the formed wire helix from said lengthwise passage, said lengthwise passage and said inlet opening having a conjoint axis, means supporting said housing means for free rotation about said conjoint axis, said housing means defining a plurality of transverse passages which intersect said lengthwise passage at axially spaced locations along said lengthwise passage, a corresponding plurality of roller-supporting bodies received individually in said transverse passages, a corresponding plurality of rotatable rollers individually supported in said lengthwise passage by said bodies and each having a peripheral wire-engaging groove which encircles the axis of rotation of the roller, the width of the groove of each roller being substantially smaller than the width of said lengthwise passage in the housing means, each of said roller grooves presenting a wire-receiving peripheral portion which is offset transversely from said conjoint axis, with successive rollers along said lengthwise passage presenting said wire-receiving offset peripheral portions located respectively on opposite sides of said conjoint axis and with the respective axes of rotation of successive rollers along said lengthwise passage extending at opposite oblique angles to said conjoint axis to impart a helical twist to the wire as it engages said wire-receiving offset peripheral portions of the successive rollers in its travel from one end of said lengthwise passage to the other, means for adjusting each of said roller-supporting bodies toward and from said conjoint axis within its respective transverse passage in the housing means to position the corresponding roller with respect to said conjoint axis, and means supporting said roller-supporting bodies for adjustment to various angular positions in the respective transverse passages to adjust said opposite oblique angles to control the diameter of the wire helix being formed, said housing means, roller-supporting bodies and rollers being freely rotated about said conjoint axis by the feed of the wire being formed into said helix.

References Cited in the file of this patent

UNITED STATES PATENTS

| 481,444 | Vermeulen | Aug. 23, 1892 |
| 600,790 | Jones | Mar. 15, 1898 |
| 640,670 | Lane | Jan. 2, 1900 |
| 805,724 | Harter | Nov. 28, 1905 |
| 890,907 | Horsley | June 16, 1908 |
| 1,283,336 | Shuster | Oct. 29, 1918 |
| 1,437,488 | Blashill | Dec. 5, 1922 |
| 1,498,394 | Mahoney | June 17, 1924 |
| 1,570,036 | Beyea | Jan. 19, 1926 |
| 1,945,469 | Roberts | Jan. 30, 1934 |
| 2,188,407 | Horton | Jan. 30, 1940 |
| 2,227,602 | Platt | Jan. 7, 1941 |
| 2,388,106 | Woller | Oct. 30, 1945 |
| 2,588,663 | Shane | Mar. 11, 1952 |

FOREIGN PATENTS

| 23,040 | Great Britain | Nov. 2, 1898 |
| 88,051 | Sweden | Dec. 8, 1936 |